(12) United States Patent
Lee et al.

(10) Patent No.: US 9,924,185 B2
(45) Date of Patent: Mar. 20, 2018

(54) METHOD FOR INDUCING A MERGE CANDIDATE BLOCK AND DEVICE USING SAME

(71) Applicant: KT CORPORATION, Gyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/209,885

(22) Filed: Jul. 14, 2016

(65) Prior Publication Data

US 2016/0323593 A1     Nov. 3, 2016

Related U.S. Application Data

(63) Continuation of application No. 14/971,260, filed on Dec. 16, 2015, which is a continuation of application
(Continued)

(30) Foreign Application Priority Data

Sep. 23, 2011 (KR) .......................... 10-2011-0096138
Apr. 17, 2012 (KR) .......................... 10-2012-0039500

(51) Int. Cl.
*H04N 19/44* (2014.01)
*H04N 19/52* (2014.01)
(Continued)

(52) U.S. Cl.
CPC ............ *H04N 19/44* (2014.11); *H04N 19/122* (2014.11); *H04N 19/137* (2014.11);
(Continued)

(58) Field of Classification Search
CPC ...... H04N 19/52; H04N 19/61; H04N 19/593; H04N 19/82
(Continued)

(56) References Cited

U.S. PATENT DOCUMENTS

| 8,311,118 B2 | 11/2012 | Lee et al. |
| 8,345,764 B2 | 1/2013 | Zhan et al. |

(Continued)

FOREIGN PATENT DOCUMENTS

| CN | 1471320 A | 1/2004 |
| CN | 101662631 A | 3/2010 |

(Continued)

OTHER PUBLICATIONS

Minhua Zhou, "Parallelized merge/skip mode for HEVC", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F069, pp. 1-13.

(Continued)

*Primary Examiner* — Nguyen Truong
(74) *Attorney, Agent, or Firm* — IP Legal Services, LLC

(57) ABSTRACT

The present invention relates to a method for inducing a merge candidate block and a device using same. An image decoding method involves decoding motion estimation region (MER) related information; determining whether or not a predicted target block and a spatial merge candidate block are included in the same MER; and determining the spatial merge candidate block to be an unavailable merge candidate block when the predicted target block and the spatial merge candidate block are included in the same MER. Accordingly, by parallelly performing the method for inducing a merge candidate, parallel processing is enabled and the computation amount and implementation complexity are reduced.

2 Claims, 8 Drawing Sheets

Related U.S. Application Data

No. 13/977,778, filed as application No. PCT/KR2012/007176 on Sep. 6, 2012, now Pat. No. 9,253,498.

(51) Int. Cl.

| | | |
|---|---|---|
| H04N 19/61 | (2014.01) | |
| H04N 19/593 | (2014.01) | |
| H04N 19/82 | (2014.01) | |
| H04N 19/436 | (2014.01) | |
| H04N 19/176 | (2014.01) | |
| H04N 19/182 | (2014.01) | |
| H04N 19/513 | (2014.01) | |
| H04N 19/51 | (2014.01) | |
| H04N 19/122 | (2014.01) | |
| H04N 19/137 | (2014.01) | |
| H04N 19/91 | (2014.01) | |

(52) U.S. Cl.
CPC ......... *H04N 19/176* (2014.11); *H04N 19/182* (2014.11); *H04N 19/436* (2014.11); *H04N 19/51* (2014.11); *H04N 19/513* (2014.11); *H04N 19/52* (2014.11); *H04N 19/593* (2014.11); *H04N 19/61* (2014.11); *H04N 19/82* (2014.11); *H04N 19/91* (2014.11)

(58) Field of Classification Search
USPC ...................................... 375/240.16
See application file for complete search history.

(56) References Cited

U.S. PATENT DOCUMENTS

| | | | |
|---|---|---|---|
| 8,369,410 | B2 | 2/2013 | Lee et al. |
| 8,379,718 | B2 | 2/2013 | Wang et al. |
| 8,755,437 | B2 | 6/2014 | Lin et al. |
| 2004/0001546 | A1 | 1/2004 | Tourapis et al. |
| 2004/0047418 | A1 | 3/2004 | Tourapis et al. |
| 2006/0280253 | A1 | 12/2006 | Tourapis et al. |
| 2007/0014358 | A1 | 1/2007 | Tourapis et al. |
| 2009/0252230 | A1 | 10/2009 | Zhan et al. |
| 2010/0054336 | A1 | 3/2010 | Okumura et al. |
| 2011/0038420 | A1 | 2/2011 | Lee et al. |
| 2011/0051811 | A1 | 3/2011 | Wang et al. |
| 2011/0150095 | A1 | 6/2011 | Choi et al. |
| 2011/0243229 | A1 | 10/2011 | Kim et al. |
| 2012/0008688 | A1 | 1/2012 | Tsai et al. |
| 2012/0128060 | A1 | 5/2012 | Lin et al. |
| 2012/0134415 | A1 | 5/2012 | Lin et al. |
| 2012/0134416 | A1* | 5/2012 | Lin ................... H04N 19/52 375/240.16 |
| 2012/0236941 | A1 | 9/2012 | Lin et al. |
| 2012/0236942 | A1 | 9/2012 | Lin et al. |
| 2012/0257678 | A1 | 10/2012 | Zhou et al. |
| 2012/0263231 | A1 | 10/2012 | Zhou |
| 2013/0058415 | A1 | 3/2013 | Lee et al. |
| 2013/0077691 | A1 | 3/2013 | Zheng et al. |
| 2013/0148737 | A1 | 6/2013 | Tourapis et al. |
| 2013/0208798 | A1 | 8/2013 | Tourapis et al. |
| 2013/0208804 | A1 | 8/2013 | Lin et al. |
| 2013/0243088 | A1 | 9/2013 | Lim et al. |
| 2013/0243098 | A1 | 9/2013 | Lin et al. |
| 2013/0279593 | A1 | 10/2013 | Lee et al. |
| 2013/0279594 | A1 | 10/2013 | Lee et al. |
| 2013/0279595 | A1 | 10/2013 | Lee et al. |
| 2013/0343461 | A1 | 12/2013 | Lee et al. |
| 2014/0016705 | A1 | 1/2014 | Lee et al. |
| 2014/0185675 | A1 | 7/2014 | Kim et al. |
| 2014/0226725 | A1 | 8/2014 | Lin et al. |
| 2014/0301461 | A1 | 10/2014 | Jeon et al. |
| 2014/0307789 | A1 | 10/2014 | Kim et al. |
| 2014/0334550 | A1 | 11/2014 | Lee et al. |
| 2014/0341284 | A1 | 11/2014 | Kim et al. |
| 2015/0016527 | A1 | 1/2015 | Tourapis et al. |
| 2015/0172695 | A1 | 6/2015 | Lee et al. |
| 2015/0208093 | A1 | 7/2015 | Lee et al. |
| 2015/0249825 | A1 | 9/2015 | Kim et al. |
| 2015/0249826 | A1 | 9/2015 | Kim et al. |
| 2015/0326876 | A1 | 11/2015 | Tsai et al. |
| 2016/0100182 | A1 | 4/2016 | Lee et al. |
| 2016/0105683 | A1 | 4/2016 | Lee et al. |
| 2016/0173872 | A1 | 6/2016 | Lin et al. |
| 2016/0173905 | A1 | 6/2016 | Lin et al. |
| 2016/0205410 | A1 | 7/2016 | Lin et al. |
| 2016/0295236 | A1 | 10/2016 | Lee et al. |
| 2017/0054995 | A1 | 2/2017 | Kim et al. |
| 2017/0078673 | A1 | 3/2017 | Kim et al. |
| 2017/0094309 | A1 | 3/2017 | Lee et al. |
| 2017/0127059 | A1 | 5/2017 | Kim et al. |
| 2017/0142419 | A1 | 5/2017 | Kim et al. |
| 2017/0142420 | A1 | 5/2017 | Kim et al. |
| 2017/0214922 | A1 | 7/2017 | Jeon et al. |
| 2017/0237978 | A1 | 8/2017 | Kim et al. |
| 2017/0237979 | A1 | 8/2017 | Kim et al. |
| 2017/0237993 | A1 | 8/2017 | Kim et al. |

FOREIGN PATENT DOCUMENTS

| | | | |
|---|---|---|---|
| EP | | 2755389 A2 | 7/2014 |
| EP | | 2797325 A1 | 10/2014 |
| GB | | 2507910 A | 5/2014 |
| GB | | 2508739 A | 6/2014 |
| JP | | 2014-517658 A | 7/2014 |
| JP | | 2014-529254 A | 10/2014 |
| JP | | 2014-533059 A | 12/2014 |
| JP | | 5808427 B2 | 11/2015 |
| JP | | 6062509 B2 | 1/2017 |
| JP | | 6130430 B2 | 5/2017 |
| KR | 10-2010-0033676 A | | 3/2010 |
| KR | 10-2011-0017301 A | | 2/2011 |
| KR | 10-2011-0073257 A | | 6/2011 |
| RU | | 2310231 C2 | 11/2007 |
| WO | | 2010/032941 A2 | 3/2010 |
| WO | | 2011/019247 A2 | 2/2011 |
| WO | | 2012/081949 A2 | 6/2012 |
| WO | | 2012/177644 A1 | 12/2012 |
| WO | | 2013/036071 A2 | 3/2013 |
| WO | | 2013/070001 A1 | 5/2013 |

OTHER PUBLICATIONS

Xing Wen et al., "Parallel Merge/skip Mode for HEVC", Joint Collaborative Team on Video Coding (JCT-VC) of ITU-T SG16 WP3 and ISO/IEC JTC1/SC291WG11, 7th Meeting: Geneva, CH, Nov. 2011, JCTVC-G387, pp. 1-13.

Minhua Zhou et al., "A study on HM3.0 parsing throughput issue", Joint Collaborative Team on Video Coding (JCT-VC) of ITU-T SG16 WP3 and ISO/IEC JTC1/SC291WG11, 6th Meeting: Torino, IT, Jul. 2011, JCTVC-F068, pp. 1-17.

Minhua Zhou et al., "CE9: Simplified AMVP design (SPO6S1, SPO6S2)", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F088, pp. 1-12.

Yunfei Zheng et al., "Merge Candidate Selection in 2NxN, Nx2N, and NxN Mode", Joint Collaborative Team on Video Coding (JCT-VC) of ITU-T SG16 WP3 and ISO/IEC JTC1/SC291WG11, 6th Meeting: Torino, IT, Jul. 2011, JCTVCF302, pp. 1-6.

Benjamin Bross et al., "Core Experiment 9: MV Coding and Skip/Merge Operations", Joint Collaborative Team on Video Coding (JCT-VC) of ITU-T SG16 WP3 and ISO/IEC JTC1/SC291WG11, 6th Meeting: Torino, IT, Jul. 14-22, 2011, JCTVC-F909, pp. 1-11.

Bin Li et al., "Cross-check of parallelized merge/skip mode (JCTVC-F069)", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F208, pp. 1-3.

Yongjoon Jeon et al., "Non-CE9: improvement on parallelized merge/skip mode", Joint Collaborative Team on Video Coding

(56) References Cited

OTHER PUBLICATIONS (JCT-VC) of ITU-T SG16 WP3 and ISO/IEC JTC1/SC291WG11, 7th Meeting: Geneva, CH, Nov. 19-30, 2011, JCTVC-G164, pp. 1-7.

Steffen Kamp et al., "Description of video coding technology proposal by RWTH Aachen University", Joint collaborative Team on Video Coding (JCT-VC) of ITU-T SG16 WP3 and ISO/IEC JTC1/SC291WG11, 1st Meeting: Dresden, DE, 15-23 Apr. 2010, JCTVC-A112, pp. 1-38.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC291WG11, 5th Meeting: Geneva, CH, Mar. 16-23, 2011, JCTVC-E503, pp. 1-8.

Hui Yong Kim et al., "CU-based Merge Candidate List Construction", Document: JCTVC-G416, Joint Collaborative Team on Video Coding (JCT-VC) of ITU-T SG16 WP3 and ISO/IEC JTC1/SC29/WG11, 7th Meeting: Geneva, Nov. 21-30, 2011, pp. 1-15.

\* cited by examiner

METHOD FOR INDUCING A MERGE CANDIDATE BLOCK AND DEVICE USING SAME

CROSS REFERENCE TO RELATED APPLICATIONS

The application is a Continuation of U.S. patent application Ser. No. 14/971,260 (filed on Dec. 16, 2015), which is a Continuation of U.S. patent application Ser. No. 13/977,778 (filed on Jul. 1, 2013), now issued as U.S. Pat. No. 9,253,498, which is a National Stage Patent Application of PCT International Patent Application No. PCT/KR2012/007176 (filed on Sep. 6, 2012) under 35 U.S.C. § 371, which claims priority to Korean Patent Application Nos. 10-2011-0096138 (filed on Sep. 23, 2011) and 10-2012-0039500 (filed on Apr. 17, 2012), the teachings of which are incorporated herein in their entireties by reference.

TECHNICAL FIELD

The present invention relates to a method of encoding and decoding video and, more particularly, to a method of deriving a merge candidate block and an apparatus using the same.

BACKGROUND ART

Recently, a demand for a video with a high resolution and a high quality such as a high definition (HD) video and an ultra high definition (UHD) video is increased in various application fields. As resolution and quality of video become higher, an amount of video relatively increases in comparison to an existing video, and thus, in a case that where the video is transmitted using a medium such as an existing wire or wireless broadband network or stored in an existing storage medium, a transmission cost and a storage cost would be increased. In order to solve these problems generated as resolution and quality are getting higher, video compression techniques of high efficiency may be utilized.

The video compression techniques include various techniques such as an inter(picture) prediction technique for predicting a pixel value included in a current picture from a before or after picture of the current picture, an intra (picture) prediction technique for predicting the pixel value included in a current picture by using pixel information within the current picture, and an entropy encoding technique for assigning a shorter code to a high occurrence frequency value and assigning a longer code to a low occurrence frequency value, and the video data can be effectively compressed to be transmitted or stored by using such video compression technique.

DISCLOSURE

Technical Problem

The first purpose of the present invention is to provide a method of deriving a merge candidate with a parallel processing.

The second purpose of the present invention is to provide an apparatus for performing a method of deriving a merge candidate with a parallel processing.

Technical Solution

In accordance with an aspect of the present invention for achieving the first objective of the present invention described above, a method of deriving a merge candidate is provided. The method may include decoding motion estimation region (MER) related information; determining whether a prediction object block and a spatial merge candidate block are included in the same MER; and deciding the spatial merge candidate block as an unavailable merge candidate block if determining a merge candidate block which does not use the spatial merge candidate block when the prediction object block and the spatial merge candidate block are included in the same MER. The method may further include adaptively determining a spatial merge candidate block according to a size of the MER and a size of the prediction object block if the prediction object block and the spatial merge candidate block are included in the same MER. If the size of the MER is 8×8 and the size of the prediction object block is 8×4 or 4×8, at least one of spatial merge candidate blocks of the prediction object block may be replaced with a block including a point located outside of the MER. The method may further include determining whether the spatial merge candidate block is included in an MER that is not yet decoded. The method may further include replacing the spatial merge candidate block with a block included in other MER if the prediction object block and the spatial merge candidate block are included in the same MER. The replaced spatial merge candidate block may be a spatial merge candidate block which is adaptively replaced to be included in an MER different from the prediction object block according to a location of the spatial merge candidate block included in the same MER. The MER related information may be information related to the size of the MER and transmitted in unit of a picture. The determining whether the prediction object block and the spatial merge candidate block are included in the same MER may include determining whether the prediction object block and the spatial merge candidate block are included in the same MER according to a determination equation based on location information of the prediction object block, location information of the spatial merge candidate block, and size information of the MER.

In accordance with another aspect of the present invention for achieving the second objective of the present invention described above, an image decoding apparatus is provided. The apparatus may include an entropy decoding unit for decoding motion estimation region (MER) related information and a prediction unit for determining whether a prediction object block and a spatial merge candidate block are included in the same MER and deciding the spatial merge candidate block as an unavailable merge candidate block if the prediction object block and the spatial merge candidate block are included in the same MER. The prediction unit may be a prediction unit which adaptively determines a spatial merge candidate block according to a size of the MER and a size of the prediction object block if the prediction object block and the spatial merge candidate block are included in the same MER. If the size of the MER is 8×8 and the size of the prediction object block is 8×4 or 4×8, the prediction unit may replace at least one of spatial merge candidate blocks of the prediction object block with a block including a point located outside of the MER. The prediction unit may determine whether the spatial merge candidate block is included in an MER that is not yet decoded. The prediction unit may be a prediction unit which replaces the spatial merge candidate block with a block included in other MER when the prediction object block and the spatial merge candidate block are included in the same MER. The replaced spatial merge candidate block may be a spatial merge candidate block which is adaptively replaced to be included in an MER different from the prediction object block according to a location of the spatial merge candidate block included in the same MER. The MER related information may be information related to the size of the MER, and transmitted in unit of a picture. The prediction unit may be a prediction unit which determines whether the prediction object block and the spatial merge candidate block are included in the same MER based on a determination equation according to location information of the prediction object block, location information of the spatial merge candidate block, and size information of the MER.

Advantageous Effects

According to a method of deriving a merge candidate block and an apparatus using same described in exemplary embodiments of the present invention, a parallel processing can be achieved by performing the method of deriving the merge candidate block in parallel, thus, a computational quality and implemental complexity can be reduced.

MODE FOR INVENTION

While various modifications and example embodiments can be made, only particular example embodiments will be described more fully herein with reference to the accompanying drawings. However, the present invention should not be construed as limited to only the example embodiments set forth herein but rather should be understood to cover all modifications, equivalents or alternatives falling within the scope and technical terms of the invention. Like numbers refer to like elements throughout the drawings.

It will be understood that, although the terms first, second, etc. may be used herein to describe various elements, these elements should not be limited by these terms. These terms are only used to distinguish one element from another. These terms are only used to distinguish one element from another element. For example, a first element could be termed a second element without departing from the teachings of the present invention, and similarly, the second element could be termed the first element. The term "and/or" includes a combination of a plurality of associated listed items or any of the plurality of the associated listed items.

It will be understood that, when a feature or element is referred to as being "connected" or "coupled" to another feature or element, it can be directly connected or coupled to the other element or intervening elements may be present. In contrast, when a feature or element is referred to as being "directly connected" or "directly coupled" to another element, it will be understood that there are no intervening elements present.

The terminology used herein is for the purpose of describing particular embodiments only and is not intended to be limiting of example embodiments of the invention. The singular forms "a", "an" and "the" are intended to include the plural forms as well, unless the context clearly indicates otherwise. It will be understood that the terms "comprises," or "includes," when used herein, specify the presence of stated features, integers, steps, operations, elements, components or any combinations thereof, but do not preclude the presence or addition of one or more other features, integers, steps, operations, elements, components, or any combinations thereof.

Hereinafter, the present invention will be described in detail with reference to the accompanying drawings. Hereinafter, the same reference numbers are used throughout the drawings to refer to the same parts and a repetitive explanation of the same parts will be omitted.

Figure 1:
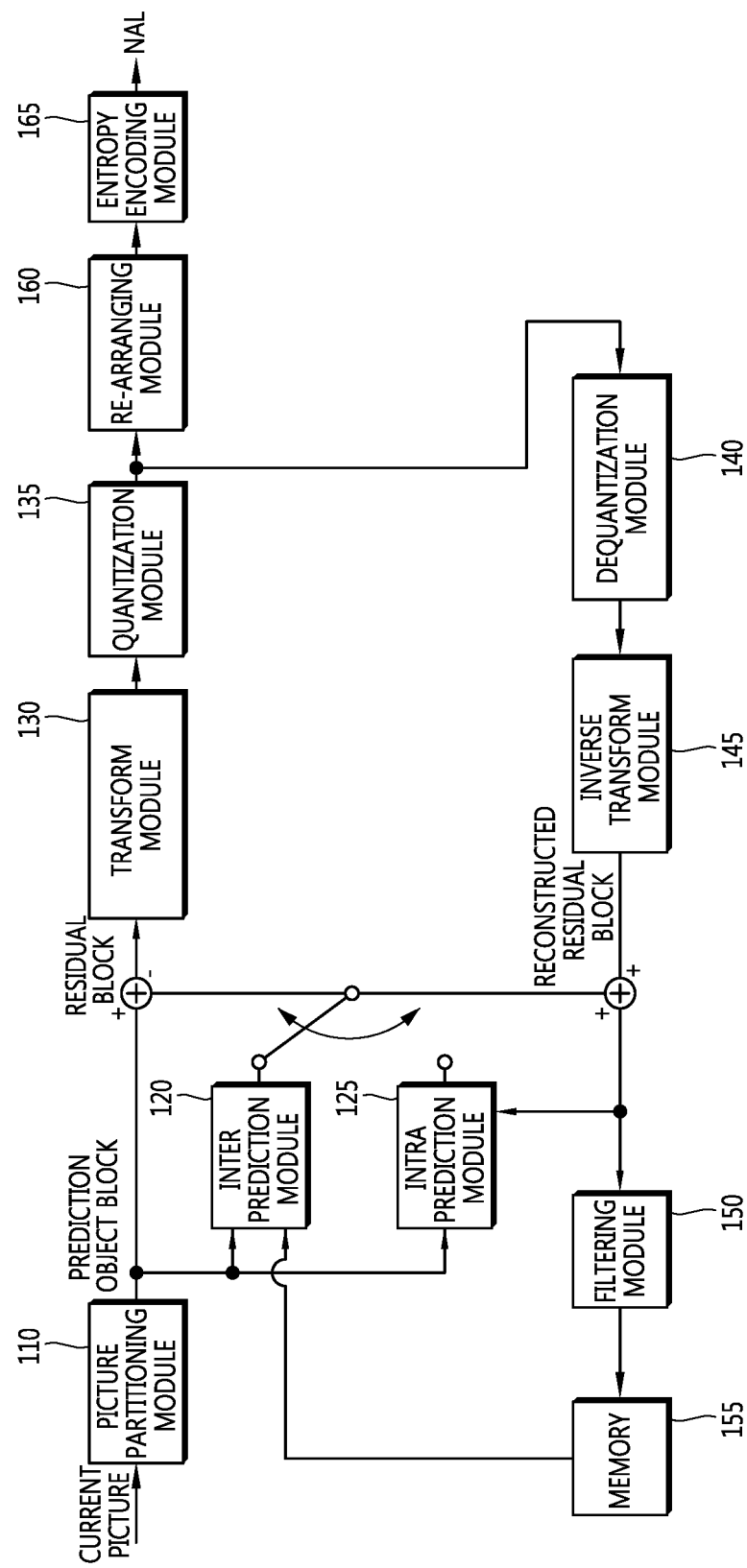
FIG. 1 is a block diagram illustrating a video encoder according to an exemplary embodiment of the present invention.

FIG. 1 is a block diagram illustrating a video encoder according to an exemplary embodiment of the present invention.

Referring to FIG. 1, a video encoder 100 may include a picture partitioning module 110, an inter prediction module 120, an intra prediction module 125, a transform module 130, a quantization module 135, a re-arranging module 160, an entropy encoding module 165, an dequantization module 140, an inverse transform module 145, a filtering module 150, and a memory 155.

Each module shown in FIG. 1 is independently illustrated in order to provide different features of functions in the video encoder and is not intended to mean that each module is configured as a separate hardware or a software component unit. That is, each module is listed as respective element for illustrative purposes, and at least two modules among modules may be combined into one element or one module may be divided into a plurality of elements to perform a function, and an embodiment in which the respective modules are combined or divided is included in the claim scope of the present invention without departing from the essence of the present invention.

Also, a part of elements may not be an indispensable element for performing an essential function in the present invention but merely a selective element for improving performance. The present invention may be implemented only with elements essential for implementing the essence of the present invention and excluding elements used merely to improve performance, and a configuration including only the essential elements excluding the selective elements, which are used only to improve performance, is also included in the claim scope of the present invention.

The picture partitioning module 110 may split an input picture into at least one processing unit. Here, the processing unit may be a prediction unit (PU), a transform unit (TU), or a coding unit (CU). The picture partitioning module 110 may split one picture into a combination of a plurality of coding units, prediction units and transform units and may encode the picture by selecting one combination of a coding unit, prediction unit(s) and transform unit(s) based on a predetermined criterion (for example, a cost function).

For example, one picture may be partitioned into a plurality of the coding units. In order to partition the coding unit, a recursive tree structure such as a quad tree structure may be used, and a coding unit which is split into other coding units with a picture or a largest coding unit as a root may be split to have a child node as many as a number of split coding units. A coding unit that is not split any further according to a certain constraint becomes a leaf node. In other words, when it is assumed that only a square partitioning is available for one coding unit, one coding unit may be split up to four different coding units.

Hereinafter, in exemplary embodiments of the present invention, the coding unit may be used to refer to not only a unit for encoding but also a unit for decoding.

The prediction unit may be partitioned with a form of squares or rectangles having the same size within one coding unit.

When generating the prediction unit for performing an intra prediction based on the coding unit, if the coding unit is not a smallest coding unit, the intra prediction may be performed without being split into a plurality of prediction units in an N×N unit.

The prediction module may include the inter prediction module 120 for performing an inter prediction and the intra prediction module 125 for performing an intra prediction. With respect to the prediction unit, the prediction module may determine whether to perform the inter prediction or whether to perform the intra prediction, and specific information (e.g., an intra prediction mode, a motion vector, a reference picture, etc.) according to each prediction method may determine. Here, a processing unit for performing the prediction and a processing unit for determining the prediction method and a specific detail may be different. For example, the prediction method and the prediction mode may be determined in the prediction unit and the prediction may be performed in the transform unit. A residual value (a residual block) between a generated prediction block and an original block may be inputted to the transform module 130. Also, prediction mode information, motion vector information, etc. used for the prediction may be encoded in the entropy encoding module 135 along with the residual value to be transmitted to the decoder. When a specific encoding mode used, it is possible that the prediction block is not generated through the prediction module 120, 125 but the original block is encoded as it is to be transmitted to a decoder.

The inter prediction module may predict on the prediction unit based on information of at least one picture among pictures before or after for a current picture. The inter prediction module may include a reference picture interpolation module, a motion prediction module, and a motion compensation module.

The reference picture interpolation module may be provided with reference picture information from the memory 155 and may generate pixel information in less than an integer pixel unit from the reference picture. In case of a luma pixel, a DCT-based 8 tap interpolation filter may be used in which a filter coefficient is varied to generate pixel information less than the integer pixel unit by a unit of ¼ pixel. In case of a chroma signal, a DCT-based 4 tap interpolation filter may be used in which a filter coefficient is varied to generate pixel information less than the integer pixel unit by a unit of ⅛ pixel.

The motion prediction module may perform motion prediction based on a reference picture interpolated by the reference picture interpolation module. For a method of obtaining the motion vector, various methods such as FBMA (Full search-based Block Matching Algorithm), TSS (Three Step Search), or NTS (New Three-Step Search Algorithm) may be used. The motion vector may have a motion vector value in a unit of ½ or ¼ pixel based on the interpolated pixel. The motion prediction module may predict a current prediction unit by varying the motion prediction method. As a motion prediction method, various methods such as a skip mode, a merge mode, or advanced motion vector prediction (AMVP) mode may be used.

According to exemplary embodiments of the present invention, when performing the inter prediction, the motion estimation region (MER) may be defined to perform the prediction in parallel. For example, when performing the inter prediction using the merge mode or the skip mode, whether a prediction object block and a spatial merge candidate block are included in the same MER may be determined, and when the prediction object block and the spatial merge candidate block are not included in the same MER, the spatial merge candidate block may be determined as not available or a merge candidate block may be determined by determining whether the spatial merge candidate block is included in an MER that is not yet decoded. Hereinafter, in exemplary embodiments of the present invention, an operation of the prediction unit when performing the inter prediction is described.

The inter prediction unit may generate the prediction unit based on information on reference pixels neighboring a current block, where the reference pixels are pixels within the current picture. If a neighboring block of the current prediction unit is a block on which the inter prediction is performed such that a reference pixels are pixels on which the inter prediction is performed, the reference pixels included in the block on which the inter prediction is performed may be replaced with the reference pixels of the neighboring block on which the intra prediction is performed. In other words, when the reference pixel is not available, reference pixels which are not available may be replaced with at least one reference pixel among available reference pixels.

The intra prediction may have directional prediction modes which use information on the reference pixels according to a prediction direction and non-directional modes which do not use the directional information when performing the prediction. A mode for predicting information on luma samples and a mode for predicting information on chroma samples may be different. Further, information on intra prediction mode which is used for the luma samples or information on predicted luma signal may be utilized to predict information on chroma samples.

In case where a size of the prediction unit and a size of the transform unit are the same when performing the intra prediction, the intra prediction may be performed on the prediction unit based on pixels which exist in a left side of the prediction unit, pixels which exist in a left upper region, and pixels which exist on an upper region. However, in a case where the size of the prediction unit and the size of the transform unit are different when performing the intra prediction, the intra prediction may be performed by using the reference pixels based on the transform unit. Also, the intra prediction which uses N×N division only with respect to the smallest coding unit may be used.

In the intra prediction method, according to the prediction mode, a mode dependent intra smoothing (MDIS) filter may be applied to the reference pixel to generate the prediction block. A kind of the MDIS filter which applies to the reference pixel may be different. In order to perform the intra prediction, the intra prediction mode of the current prediction unit may be predicted from the intra prediction mode of the prediction unit neighboring to the current prediction unit. When predicting the prediction mode of the current prediction unit by using mode information predicted from a neighboring prediction unit, if the intra prediction modes of the current prediction unit and the neighboring prediction unit are the same, information that the prediction modes of the current prediction unit and the neighboring prediction unit are the same may be transmitted using predetermined flag information, and if the prediction modes of the current prediction unit and the neighboring prediction unit are different, the prediction mode information of the current block may be decoded by entropy encoding.

Also, a residual block including residual value information which is a difference between the prediction unit on which the prediction is performed based on the prediction unit generated in the prediction module 120, 125 and an original block of the prediction unit. The generated residual block may be inputted to the transform module 130. The transform module 130 may transform the residual block including the residual value information of the original block and the prediction unit generated in the prediction module 120, 125 by using a transform method such as a discrete cosine transform (DCT) or a discrete sine transform (DST). Whether to apply the DCT or the DST in order to transform the residual block may be determined based on the intra prediction mode information of the prediction unit used for generating the residual block.

The quantization module 135 may quantize values transformed into a frequency domain by the transform module 130. Depending on a block or an importance of an image, a quantization parameter may be varied. A value outputted by the quantization module 135 may be provided to the dequantization module 140 and the rearranging module 160.

The rearranging module 160 may re-arrange the quantized coefficient value with respect to the residual value.

The re-arranging module 160 may modify a coefficient of a two dimensional array of block form into a form of a one dimensional vector through a coefficient scanning method. For example, in the re-arranging module 160, from a DC coefficient to a coefficient in a high frequency domain may be scanned to be rearranged to a one dimension vector form by using a diagonal scan mode. According to a size of a transform unit and the intra prediction mode, a vertical scan mode of scanning two dimensional coefficients in a block form in a column direction or a horizontal scan mode of scanning the two dimensional coefficients in the block form in a row direction may be used instead of the diagonal scan mode. In other words, it may be determined which scan mode among the diagonal scan mode, the vertical scan mode, and the horizontal scan mode is used according to the size of the transform unit and the intra prediction mode.

The entropy encoding module 165 performs the entropy encoding based on values outputted from the re-arranging module 160. The entropy encoding may use various encoding methods such as, for example, Exponential Golomb, Context-Adaptive Binary Arithmetic Coding (CABAC).

The entropy encoding unit 165 may encode various information such as residual coefficient information of coding unit and block type information, prediction mode information, partition unit information, prediction unit information, transmission unit information, motion vector information, reference picture information, interpolation information on a block, filtering information, MER information, etc. from the re-arranging module 160 and the prediction module 120, 125.

The entropy encoding unit 165 may perform the entropy encoding on the coefficient value in the coding unit inputted from the re-arranging module 160 by using the entropy encoding method such as CABAC.

The dequantization module 140 and the inverse transform module 145 dequantizes values quantized by the quantization module 135 and inversely transforms the values transformed by the transform module 130. The residual value generated by the dequantization module 140 and the inverse transform module 145 may be added to the prediction unit predicted through the motion estimation module, the motion compensation module and the intra prediction module included in the prediction module 120, 125 to generate a reconstructed block.

The filtering module 150 may include at least one of a deblocking filter, an offset correction module, and an adaptive loop filter (ALF).

The deblocking filter may remove a block distortion generated due to a boundary between blocks in a reconstructed picture. In order to determine whether to perform the deblocking filtering, it may be determined whether to apply the deblocking filter to the current block based on pixels included in several columns or rows included in the block. When applying the deblocking filter to the block, a strong filter or a weak filter may be applied depending on a required deblocking filtering strength. Also, in applying the deblocking filter, when performing a vertical filtering and a horizontal filtering, a horizontal direction filtering and a vertical direction filtering may be processed in parallel.

The offset correction module may correct an offset from an original image by a pixel unit with respect to the image on which the deblocking filtering is performed. In order to perform the offset correction with respect to a specific picture, a method of classifying pixels included in the image into a predetermined number of regions, determining a region on which the offset is to be performed and applying the offset to a corresponding region or a method of applying the offset by considering edge information of each pixel may be used.

The adaptive loop filter (ALF) may perform filtering based on a comparison of the filtered reconstructed image and the original image. After classifying pixels included in the image into a predetermined group and determining a filter to be applied to a corresponding group, and then the filtering may be applied to each group determined to differentially with each filter. Information about whether to apply the ALF may be transmitted by the coding unit (CU) and a size and a coefficient of the ALF to be applied may be different for each block. The ALF may have various shapes, and therefore a number of coefficients in the filter may be different for each filter. Filtering related Information of ALF (filter coefficient information, ALF On/Off information, filter shape information, etc.) may be included and transmitted in a predetermined parameter set in a bitstream The memory 155 may store a reconstructed block or picture outputted from the filtering module 150, and the stored reconstructed block or picture may be provided to the prediction module 120, 125 when performing the inter prediction.

Figure 2:
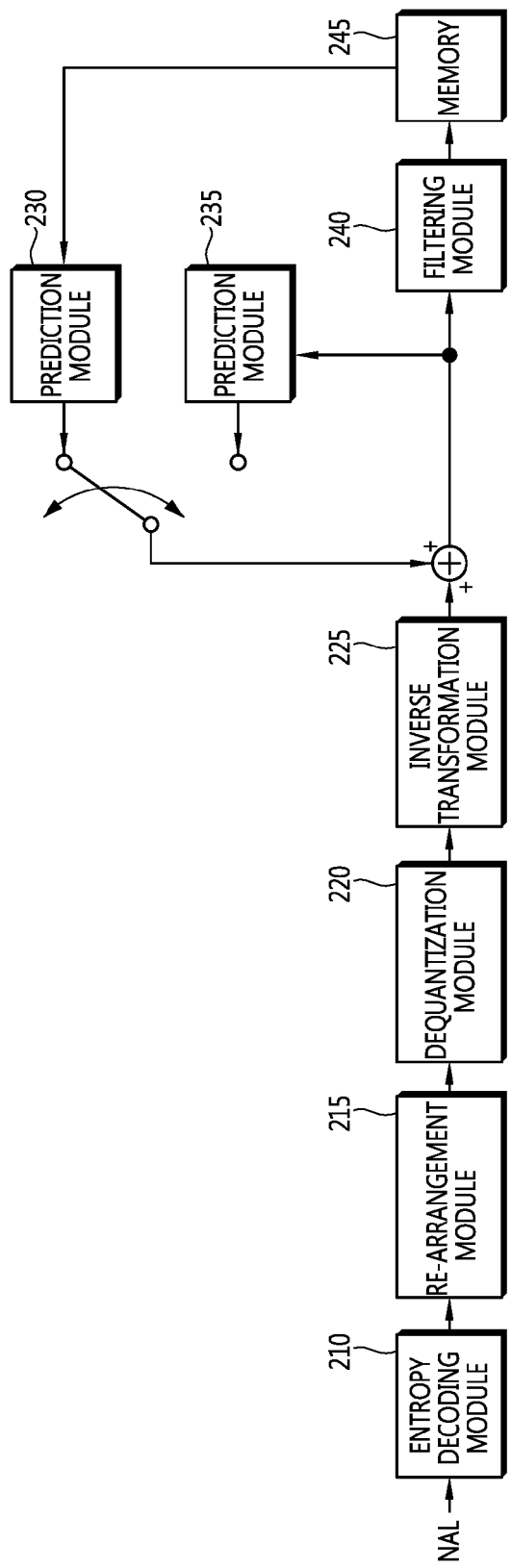
FIG. 2 is a block diagram illustrating a video decoder according to another exemplary embodiment of the present invention.

FIG. 2 is a block diagram illustrating an image decoder according to another exemplary embodiment of the present invention.

Referring to FIG. 2, a video decoder may include an entropy decoding module 210, a re-arranging module 215, a dequantization module 220, an inverse transform module 225, a prediction module 230, 235, a filter module 240, and a memory 245.

When a video bitstream is inputted from the video encoder, the input bitstream may be decoded in an order opposite to the processing order in the video encoder.

The entropy decoding module 210 may perform entropy decoding in an opposite order of performing the entropy encoding in the entropy encoding module of the video encoder. Information for generating the prediction block among information decoded by the entropy decoding module 210 may be provided to the prediction module 230, 235 and the residual values which are entropy decoded in the entropy decoding module may be inputted to the re-arranging module 215.

The entropy decoding module 210 may decode information related to the intra prediction and the inter prediction performed by the encoder. As described above, when there is a predetermined constraint for the intra prediction and the inter prediction in the video encoder, information related to the intra prediction and the inter prediction of the current block may be provided by performing the entropy decoding based on the constraint.

The re-arranging module 215 may perform rearrangement of the bitstream which is entropy decoded by the entropy decoding module 210 based on a re-arranging method of the encoder. Coefficients represented in a one dimensional vector form may be reconstructed and re-arranged in a two dimensional block form.

The dequantization module 220 may perform dequantization based on the quantization parameter provided from the encoder and the rearranged coefficients block.

The inverse transform module 225 may perform an inverse DCT and an inverse DST on a result of quantization performed by the video encoder with respect to the DCT and the DST performed by the transform module. The inverse transform may be performed based on the transmission unit determined by the video encoder. In the transform module of the video encoder, the DCT and the DST may be selectively performed according to a plurality of information such as the prediction method, the size of the current block, and the prediction direction, and the inverse transform module 225 of the video decoder may perform inverse transform based on transform information performed in the transform module of the video encoder.

The prediction module 230, 235 may generate the prediction block based on information related to generating the prediction block provided from the entropy decoding module 210 and information of the previously decoded block or picture provided form the memory 245.

The prediction module 230, 235 may include a prediction unit determination module, an inter prediction module, and an intra prediction module. The prediction unit determination module may receive various information such as prediction unit information, prediction mode information of the intra prediction method, and motion prediction related information of the inter prediction method inputted from the entropy decoder, distinguish the prediction unit in the current coding unit based on the received information, and determine whether the inter prediction is performed on the prediction unit or the intra prediction is performed on the prediction unit. The inter prediction unit may perform the inter prediction with respect to the current prediction unit based on information included in at least one picture between the previous pictures and the subsequent pictures of the current picture including the current prediction unit by using information required for the inter prediction of the current prediction unit provided by the video encoder.

In order to perform the inter prediction, it may be determined based on the coding unit whether the motion prediction method in the prediction unit included in a corresponding coding unit is the skip mode, the merge mode, or the AMVP mode.

According to an exemplary embodiment of the present invention, when performing the inter prediction, the motion estimation region (MER) may be defined to perform the prediction in parallel. For example, when performing the inter prediction using the merge or the skip, whether the prediction object block and the spatial merge candidate block are included in the same MER may be determined. When the prediction object block and the spatial merge candidate block are not included in the same MER, the spatial merge candidate block may be determined as unavailable or the spatial merge candidate block may be determined as merge candidate block by determining whether the spatial merge candidate block is included in an MER that is not yet decoded. An operation of the prediction module will be described in detail in an exemplary embodiment of the present invention.

The intra prediction module may generate a prediction block based on pixel information within the current picture. When the prediction unit is a predicting unit for performing the intra prediction, the intra prediction may be performed based on intra prediction mode information of the prediction unit provided by the video encoder. The intra prediction module may include the MDIS filter, a reference pixel interpolation module, and a DC filter. The MDIS filter is a module for performing filtering on the reference pixel of the current block, and whether to apply the filter may be determined and applied according to the prediction mode of the current prediction unit. The filtering may be performed on the reference pixel of the current block by using the prediction mode of the prediction unit and the MDIS filter information provided by the video encoder. When the prediction mode of the current block is a mode that does not perform the filtering, the MDIS filter may not apply.

The reference pixel interpolation module may generate a reference pixel in pixel unit less than an integer value by interpolating the reference pixel when the prediction mode of the prediction unit is the prediction unit for performing intra prediction based on a pixel value of the interpolated reference pixel. When the prediction mode of the current prediction unit is a prediction mode that generates the prediction block without interpolating the reference pixel, the reference pixel may not be interpolated. The DC filter may generate the prediction block through filtering if the prediction mode of the current block is a DC mode.

The reconstructed block or picture may be provided to the filter module 240. The filter module 240 may include a deblocking filter, an offset correction module, an ALF.

Information on whether the deblocking filter is applied to a corresponding block or picture and whether a strong filter or a weak filter is applied if the deblocking filter is applied may be provided from the video encoder. The deblocking filter of the video decoder may be provided with information about the deblocking filter from the video encoder and perform deblocking filtering for the corresponding block in the video decoder. Same as the video encoder, a vertical deblocking filtering and a horizontal deblocking filtering are first performed while at least one of the vertical deblocking and the horizontal deblocking may be performed in an overlapped area. In the overlapped area of the vertical deblocking filtering and the horizontal deblocking filtering, the vertical deblocking filtering or the horizontal deblocking filtering which has not previously performed may be performed. Through this deblocking filtering process, a parallel processing of the deblocking filtering may be possible.

The offset correction module may perform offset correction on the reconstructed image based on a type of the offset correction applied to the image and offset value information.

The ALF may perform filtering based on a value of comparing the original image and the reconstructed image through filtering. The ALF may be applied to the coding unit based on information about whether to apply the ALF, information about an ALF coefficient provided from the decoder. The ALF information may be included in a particular parameter set to be provided.

The memory 245 may store the reconstructed picture or block to be used as the reference picture or the reference block and the reconstructed picture may be provided to the output module.

As described above, although the coding unit is used to refer to a unit of coding in an exemplary embodiment, the coding unit may be a unit for performing not only the encoding but also the decoding. Hereinafter, a prediction method described in FIGS. 3 through 11 according to an exemplary embodiment of the present invention may be performed by an element such as the prediction module included in FIG. 1 and FIG. 2.

Figure 3:
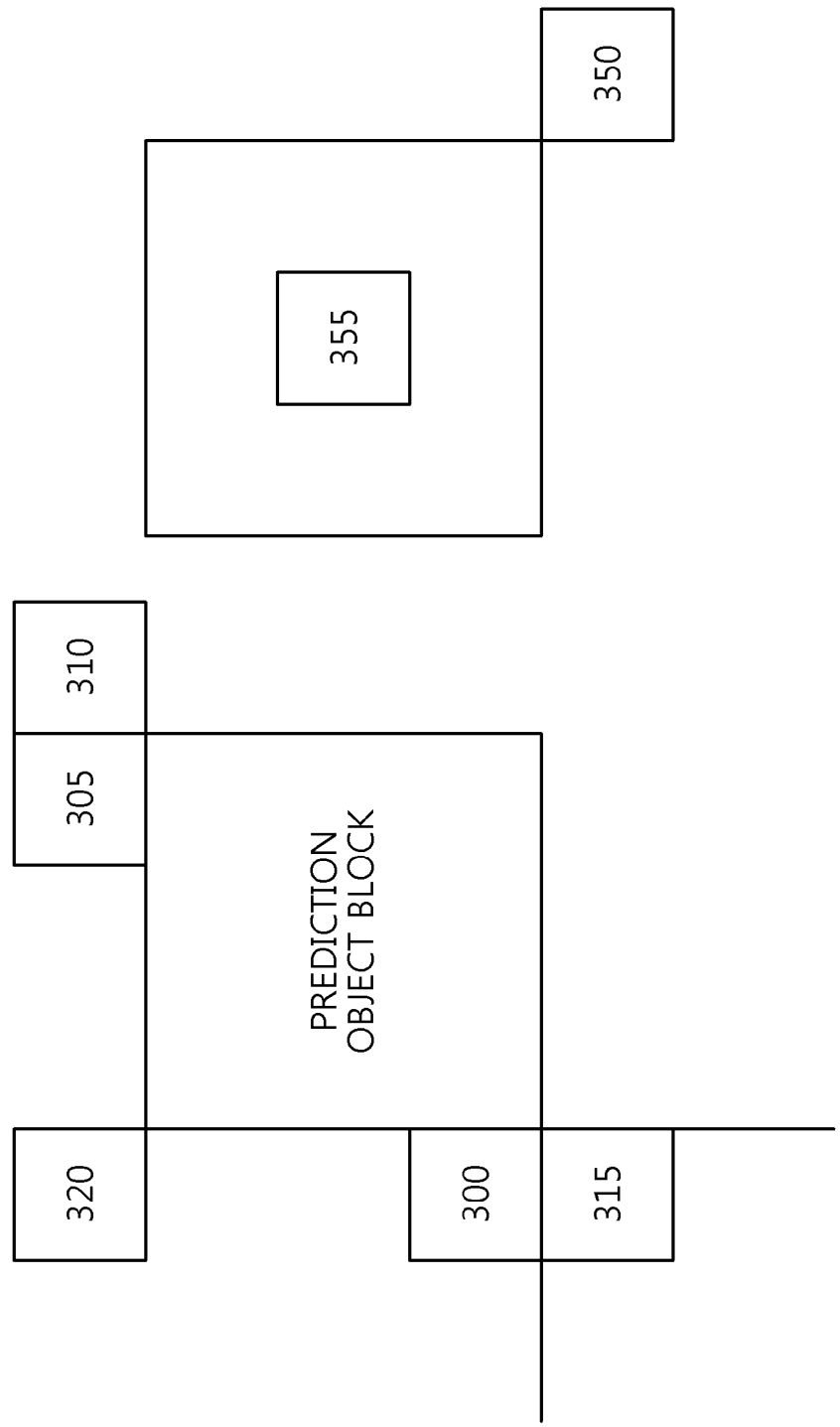
FIG. 3 is a conceptual view illustrating candidate blocks for applying a merge mode and a skip mode according to an exemplary embodiment of the present invention.

FIG. 3 is a conceptual view illustrating candidate blocks for applying merge mode and skip mode according to an exemplary embodiment of the present invention.

Hereinafter, for illustrative purposes, a description is made with respect to the merge mode in an exemplary embodiment of the present invention; however, the same method may be applied to the skip mode and such embodiment is also included in the scope of claims in the present invention.

Referring to FIG. 3, in order to perform the inter prediction through the merge mode, spatial merging candidate blocks 300, 305, 310, 315, 320 and temporal merging candidate blocks 350, 355 may be used.

When a point (xP, yP) located on a upper left portion of the prediction object block relative to a location of the prediction object block, with a width of the prediction object block, nPSW and a height of the prediction object block, sPSH, each block of the spatial merging candidate blocks 300, 305, 310, 315, 320 may be one of a first block 300 including a point (xP−1, yP+nPSH−MinPuSize), a second block 305 including a point (xP+nPSW−MinPuSize, yP−1), a third block 310 including a point (xP+nPSW, yP−1), a fourth block 315 including a point (xP−1, yP+nPSH), and a fifth block 320 including a point (xP−MinPuSize, yP−1).

The temporal merging candidate may use a plurality of candidate blocks and a first Col block (collocated block) 350 may be a block including a point (xP+nPSW, yP+nPSH) located on a Col picture (collocated picture). If the first Col block 350 does not exist or is not available (for example, if the first Col block does not perform the inter prediction), a second Col block 355 including a point (xP+(nPSW>>1), yP+(nPSH>>1)) located on the Col picture may be used instead.

According to an exemplary embodiment of the present invention, in order to perform the inter prediction using the merge mode in parallel when performing the motion prediction, whether to use the merging candidate block relative to a certain area may be determined. For example, in order to determine the merging candidate block for performing the merge mode, relative to a predetermined area of a certain size, it may be determined whether the merging candidate block exists within the predetermined area together with the prediction object block to determine whether to use the merging candidate block or not, or to replace with other merging candidate block, thereby performing the motion prediction in parallel relative to the predetermined area. Hereinafter, a parallel motion prediction method using the merge mode will be described in an exemplary embodiment of the present invention.

Figure 4:
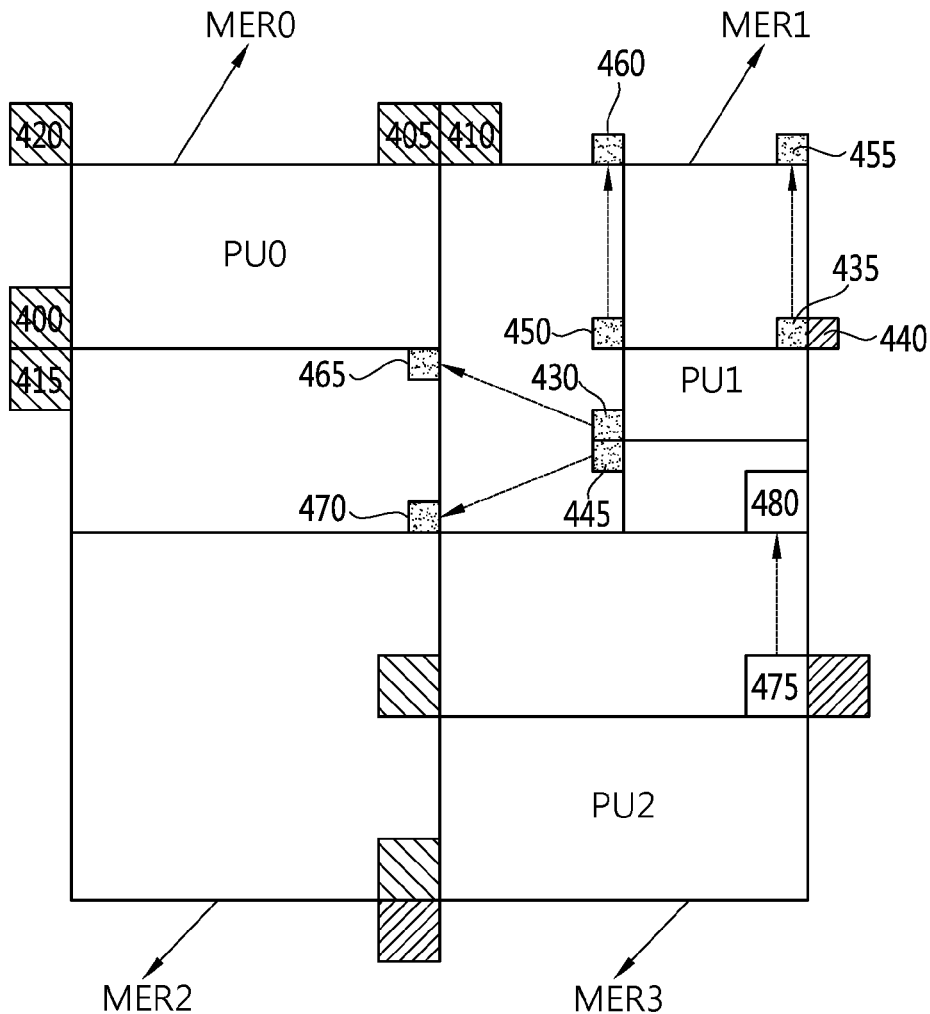
FIG. 4 is a conceptual view illustrating a method of deciding a merge candidate block according to an exemplary embodiment of the present invention.

FIG. 4 is a conceptual view illustrating a method of determining a merging candidate block according to an exemplary embodiment of the present invention.

Referring to FIG. 4, it is assumed that a largest coding unit (LCU) is split into four motion estimation regions (MER).

In case of a first prediction block PU0 included in a first MER (MER0), similar to FIG. 4, when the inter prediction is performed by using the merge mode with respect to the first prediction block PU0, five spatial merging candidate blocks 400, 405, 410, 415, 420 may exist as the spatial merging candidate blocks. The five merging candidate blocks 400, 405, 410, 415, 420 may exist in a location not included in the first MER (MER0) and may be blocks on which encoding/decoding has already been performed.

The second prediction block (PU1) is a prediction block included in a second MER (MER1) and four merging candidate blocks 430, 435, 445, 450 among the spatial merging candidate blocks 430, 435, 440, 445, 450 for performing the inter prediction using the merge mode may be blocks that exist within the second MER (MER1) and blocks that belong to the same MER which currently performs the prediction. The remaining one merging candidate block 440 may be a block that exists in a right side of the current MER and a block included in the LCU or MER on which encoding/decoding has not yet performed.

According to an exemplary embodiment of the present invention, when the merging candidate block of the current block and the current block belong to the same MER, the merging candidate block of the current block is excluded and motion information of at least one block at another location may be added as the merging candidate according to a size of the current block and an MER size.

A block including a point that exists in other MER in a vertical or horizontal direction may be added as the merging candidate block. Alternatively, a block that belongs to other MER at a location closest to the candidate block may be added as the merging candidate block. Alternatively, a block at a predetermined location according to a shape and a size of the current block may be added as a merging candidate block.

For an example, in case of the merging candidate block 435 located in an upper side of the second prediction unit (PU1) and the merging candidate block 450 located in an upper left side of the second prediction unit, blocks 455, 460 including points located outside the second MER in the vertical direction may be used as replaced merging candidate blocks. For the merging candidate block 430 located in a left side of the second prediction unit and the merging candidate block 445 located in a lower left side of the second prediction unit, blocks 465, 470 including points outside the MER in the horizontal direction may be used as the replaced merging candidate blocks. When a block is included in the same MER with the current prediction unit and thus cannot be used as the merging candidate block, the merging candidate block may be replaced with other block including a point in other MER according to a location of the merging candidate block.

In case of a third prediction block (PU2), a merging candidate block 475 included in the same MER with the third prediction block may be replaced to be used by a block 480, which exists in an upper side in the vertical direction. Further, as another exemplary embodiment of the present invention, it is possible to replace the location of the merging candidate block by replacing a location of the spatial merging candidate block with a block included in other MER in a direction not the vertical or horizontal direction and this exemplary embodiment is also included in the claim scope of the present invention.

The following steps may be performed in order to perform a method for determining the merging candidate blocks.

1) Step of Decoding Motion Estimation Region (MER) Related Information

The MER related information may include information on a size of the MER. Whether the prediction object block is included in the MER may be determined based on the information on the size of the MER and the size of the prediction object block.

2) Step of Determining Whether the Prediction Object Block and the Spatial Merging Candidate Block are Included in the Same MER In the case that the prediction object block and the spatial merging candidate block are included in the same MER, the following steps may be performed to adaptively determine the spatial merging candidate block according to the size of the MER and the size of the prediction object block.

3) Step of Determining that the Spatial Merging Candidate Block is Unavailable when the Prediction Object Block and the Spatial Merging Candidate Block are Included in the Same MER When the prediction object block and the spatial merging candidate block are included in the same MER, the spatial merging candidate block may be determined as unavailable and the spatial merging candidate block included in the same MER may be replaced with other merging candidate block. Also, as described below, it is possible that the merging candidate block which is determined as unavailable may not be used in the inter prediction with the merge mode.

According to another exemplary embodiment of the present invention, a method which does not use the merging candidate block included in the same MER with the prediction object block also can be applied.

For example, among merging candidate blocks, blocks which is included an MER which encoding/decoding is already performed on and if different from a current MER which prediction is currently performed on, are available for the inter prediction applying merge mode in parallel. The blocks may be used as the inter prediction candidate blocks with the merge mode. However, blocks that belong to the MER on which the prediction is currently performed may not be used as the inter prediction candidate block for the inter prediction with the merge mode. The block on which encoding/decoding is not performed may either not be used as the inter prediction candidate block. This exemplary embodiment is also included in the claim scope of the present invention.

Figure 5:
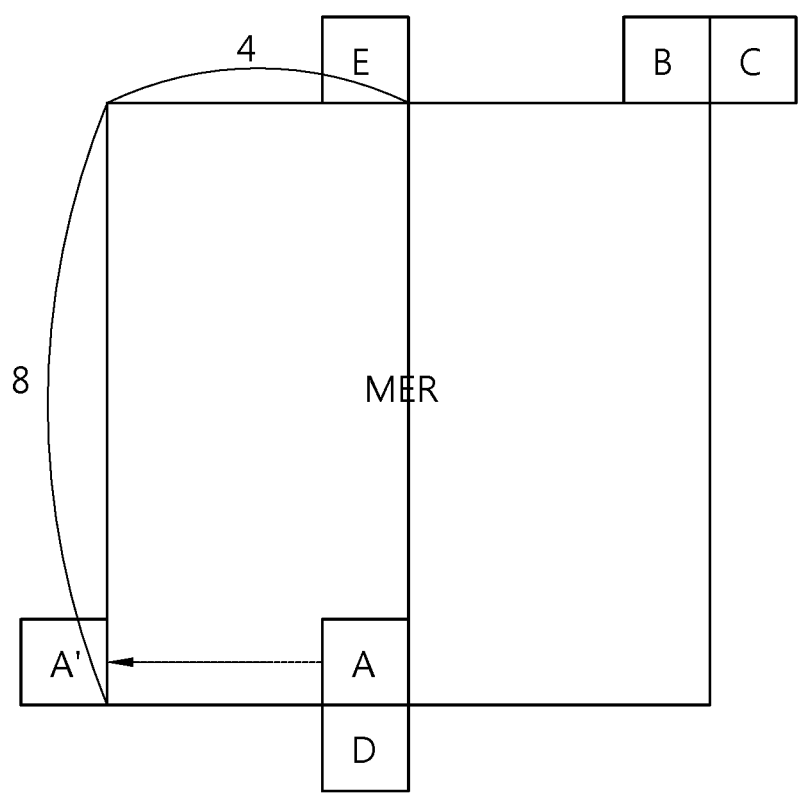
FIG. 5 is a conceptual view illustrating a method of deciding a merge candidate block according to a size of an MER according to an exemplary embodiment of the present invention.

FIG. 5 is a conceptual view illustrating a method of determining a merging candidate block based on a size of an MER according to an exemplary embodiment of the present invention.

Referring to FIG. 5, the merging candidate may be adaptively determined according to the size of the MER and the size of the current prediction unit. For example, in a case where a merging candidate corresponding to one of the location of merging candidates A, B, C, D, E is included in the same MER with the current prediction unit, the merging candidate is determined as unavailable. Here, motion information of at least one block at other location may be added as the merging candidate according to the size of the current block and the size of the MER.

In FIG. 5, it is assumed that the size of the MER is 8×8 and the prediction object block is 4×8. When the MER size is 8×8, a block of A included in the prediction object block belongs to the same MER with the prediction object block and blocks of B, C, D and E are included in a different MER from the prediction object block.

In case of the block of A, the block may be replaced with a location of a block (for example, block of A') which is included in the different MER. Therefore, according to an exemplary embodiment of the present invention, when the merging candidate block of the current block and the current block belong to the same MER, the merging candidate block of the current block may be excluded from a block for merging candidate such that the motion information of at least one block at other location may be added as the merging candidate according to the size of the current block and the MER size.

According to an exemplary embodiment of the present invention, the size information of the MER may be included in upper level syntax information to be transmitted.

Table 1 below is associated with a method of transmitting the size information on the MER in the upper level syntax.

TABLE 1

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| num_temporal_layer_switching_point_flags | ue(v) |
| for( i = 0; | |
| i < num_temporal_layer_switching_point_flags; i--) | |
|    temporal_layer_switching_point_flag[ i ] | u(1) |
| num_ref_idx_l0_default_active_minus1 | ue(v) |
| num_ref_idx_l1_default_active_minus1 | ue(v) |
| pic_init_qp_minus26 /* relative to 26 */ | se(v) |
| constrained_intra_pred_flag | u(1) |
| shared_pps_info_enabled_flag | u(1) |
| if( shared_pps_info_enabled_flag ) | |
|   if( adaptive_loop_filter_enabled_flag ) | |
|     alf_param( ) | |
| if( cu_qp_delta_enabled_flag) | |
|   max_cu_qp_delta_depth | u(4) |
|     log2_parallel_merge_level_minus2 | ue(v) |
| rbsp_trailing_bits( ) | |
| } | |

Referring to Table 1, the size information of the MER may be obtained based on a syntax element log 2_parallel_merge_level_minus2 included in a high level syntax structure such as a picture parameter set. A syntax element log 2_parallel_merge_level_minus2 may also be included in a high level syntax structure other than the picture parameter set, and this exemplary embodiment is also included in the claim scope of the present invention.

Table 2 below describes a relationship between a value of log 2_parallel_merge_level_minus2 and the size of the MER.

TABLE 2

| log2_parallel_merge_level_minus2 | MER size | Remark |
|---|---|---|
| 0 | 4 × 4 | Sequential merge skip mode for all PUs in a LCU because minimum PU size allowed by HEVC is 4 × 4 |
| 1 | 8 × 8 | Parallel merge skip mode search allowed for all PUs inside an 8 × 8 block |
| 2 | 16 × 16 | Parallel merge skip mode search allowed for all PUs inside a 16 × 16 block |
| 3 | 32 × 32 | Parallel merge skip mode search allowed for all PUs inside a 32 × 32 block |
| 4 | 64 × 64 | Parallel merge skip mode search allowed for all PUs inside a 64 × 64 block |

Referring to Table 2, the value of log 2_parallel_merge_level_minus2 may have a value from 0 to 4 inclusively, and the size of MER size may be specified differently according to the value of the syntax element. When the MER is 0, it is the same as performing the inter prediction using the merge mode without using the MER.

The syntax element including the size information of the MER may be, in an exemplary embodiment of the present invention, represented and used as the term "MER size information syntax element" and defining the MER size information syntax element as in Table 2 is an example and it is possible to specify the MER size using various different methods and such a syntax element expression method is also included in the claim scope of the present invention.

Figure 6:
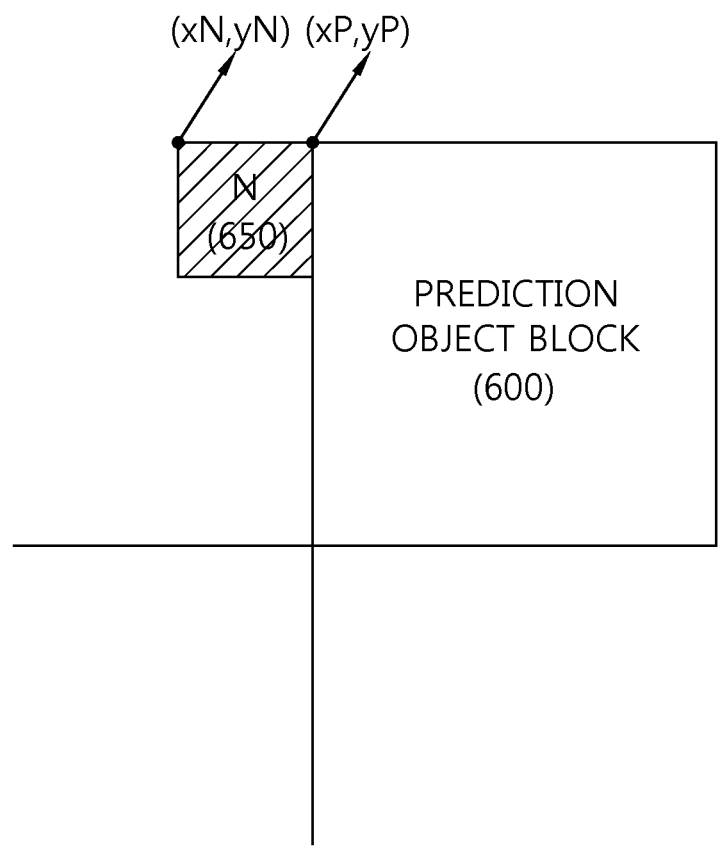
FIG. 6 is a conceptual view illustrating a method of determining whether a spatial merge candidate block of a current block is available.

FIG. 6 is a conceptual view illustrating a method of determining whether a spatial merging candidate block of the current block is available.

Referring to FIG. 6, based on locations of a prediction object block 600 and a spatial merging candidate block 650 neighboring to the prediction object block 600 and the MER size information syntax element, availability of the spatial merging candidate block may be determined.

When it is assumed that (xP, yP) is a point at a left top of the prediction object block and (xN, yN) is a point at a left top of the merging candidate block, whether the spatial merging candidate block is available may be determined through the following Math 1 and Math 2.

$$(xP>>(\log 2\_parallel\_merge\_level\_minus2+2))== \\ (xN>>\log 2\_parallel\_merge\_level\_minus2+2)) \qquad <\text{Math 1}>$$

$$(yP(\log 2\_parallel\_merge\_level\_minus2+2))== \\ (yN>>\log 2\_parallel\_merge\_level\_minus2+2)) \qquad <\text{Math 2}>$$

The above Math 1 and the Math 2 are exemplary equations for determining whether the merging candidate block and the prediction object block are included in the same MER. In addition, whether the merging candidate block and the prediction object block are included in the same MER may be determined by using a method other than the above determination method as long as it does not depart from the essence of the present invention.

Figure 7:
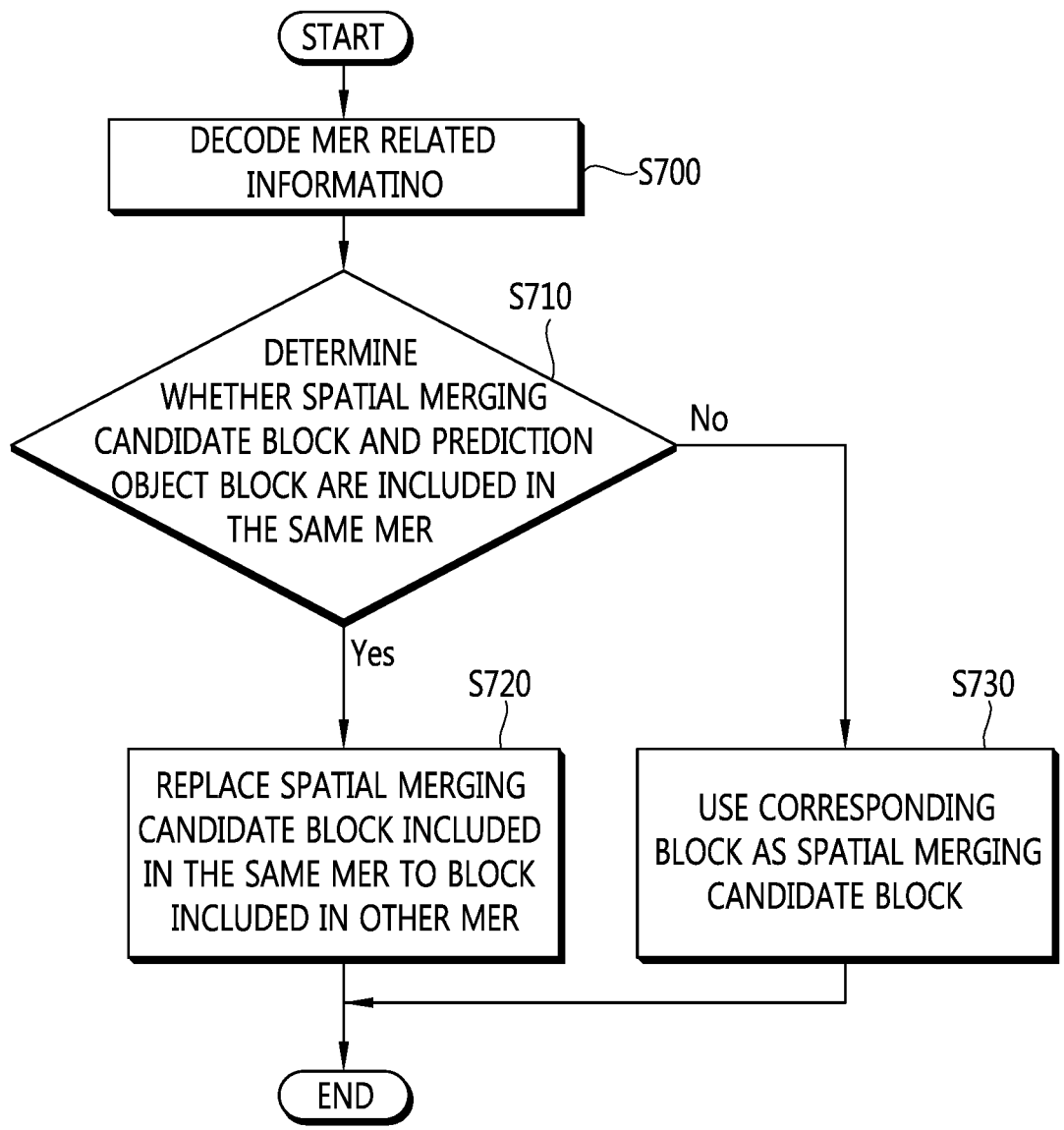
FIG. 7 is a flow chart illustrating a method of obtaining a spatial merge candidate block in a merge mode according to an exemplary embodiment of the present invention.

FIG. 7 is a flow chart illustrating a method of obtaining a spatial merging candidate block in a merge mode according to an exemplary embodiment of the present invention.

Referring to FIG. 7, the MER related information is decoded (step S700).

The MER related information may be syntax element information, as described above, and may be included in the high level syntax structure. Based on the decoded MER related information, it may be determined whether the spatial merging candidate block and the prediction object block are included in the same MER or in different MERs.

It is determined whether the spatial merging candidate block and the prediction object block are included in the same MER (step S710).

According to an exemplary embodiment of the present invention, when the merging candidate block of the current block and the current block are included in the same MER, the merging candidate block of the current block may be excluded and the motion information of at least one block of different location from the merging candidate block may be added as a merging candidate according to the size of the current block and the MER size (step S720). According to another exemplary embodiment of the present invention, when a spatial merging candidate block and the prediction object block are included in the same MER, instead of using the spatial merging candidate block included in the MER as the merging candidate block, a block included in other MER with other location may replace the spatial merging candidate block to perform the inter prediction.

Also, in another exemplary embodiment, when a spatial merging candidate block and the prediction object block are included in the same MER, the spatial merging candidate block included in the MER may not be used as the merging candidate block, as described above.

When the spatial merging candidate block and the prediction candidate block are not included in the same MER, the inter prediction is performed based on a corresponding spatial merging candidate block (step S730).

Figure 8:
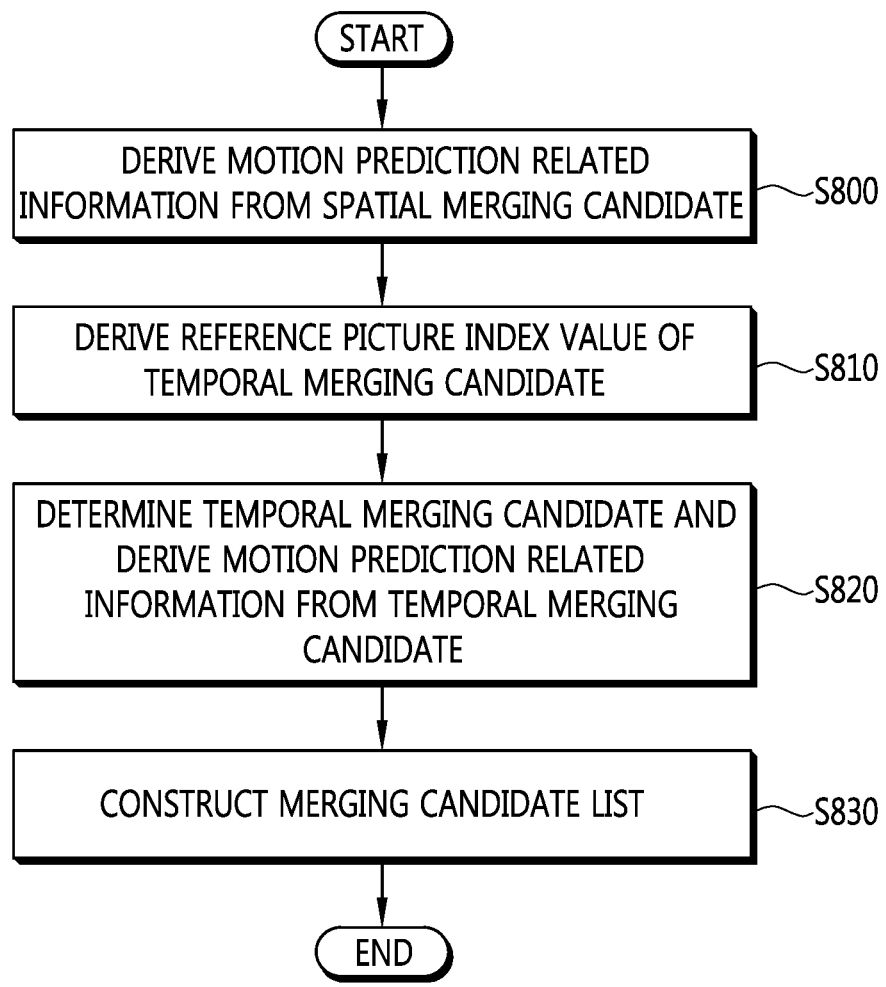
FIG. 8 is a flow chart illustrating a method of inter prediction applying a merge mode according to an exemplary embodiment of the present invention.

FIG. 8 is a flow chart illustrating a method of inter prediction using a merge mode according to an exemplary embodiment of the present invention.

Referring to FIG. 8, the motion prediction related information is derived from the spatial merging candidate (step S800).

The spatial merging candidate may be derived from the neighboring prediction unit of the prediction object block. In order to derive the spatial merging candidate, width and height information of the prediction unit, the MER information, singleMCLFlag information, and information on the location of partition may be provided. Based on the above input information, information (availableFlagN) about availability of the spatial merging candidate, reference picture information (refIdxL0, refIdxL1), list utilization information (predFlagL0N, predFlagL1N), and motion vector information (mvL0N, mvL1N) may be derived according to a location of the spatial merging candidate. The spatial merging candidate may be a plurality of blocks neighboring to the prediction object block.

According to an exemplary embodiment of the present invention, the spatial merging candidate block may be classified into three as the follows: 1) a spatial merging candidate block that is not included in the same MER and is already encoded or decoded, 2) a spatial merging candidate block that is included in the same MER, and 3) a spatial merging candidate block on which encoding and decoding has not yet been processed.

According to an exemplary embodiment of the present invention, in order to perform the inter prediction in parallel in unit of the MER, among the spatial merging candidate blocks for performing the inter prediction, the spatial merging candidate block that is not included in the same MER and is already encoded or decoded may be used as the spatial merging candidate block. Further, the spatial merging candidate block which replaces a location of the spatial merging candidate block included in the same MER may be used as the spatial merging candidate block. In other words, according to an exemplary embodiment of the present invention, when the merging candidate block of the current block is included in the same MER as the current block, the merging candidate block of the current block is excluded and the motion information of at least one block of other location may be added as the merging candidate according to the size of the current block and the MER size. As described above, a method of determining the merging candidate block may be performed through a step of decoding MER (Motion Estimation Region) related information, a step of determining whether the prediction object block and the merging candidate block are included in the same MER, and a step of determining that the merging candidate block is unavailable for inter prediction with merge mode when the merging candidate block and the prediction object block are included in the same MER.

According to another exemplary embodiment of the present invention, among the spatial merging candidate blocks for performing the inter prediction, only the spatial merging candidate block which is not included in the same MER and is already encoded or decoded may be used to perform the inter prediction.

A reference picture index value of the temporal merging candidate is derived (step S810).

The reference picture index value of the temporal merging candidate is an index value of the Col picture including the temporal merging candidate (Col block) and may be derived through a particular condition as below. For example, when a point at top left of the prediction object block is (xP, yP), a width of the is nPSW, and a height of the prediction object block is nPSH, the reference picture index value of the temporal merging candidate may be determined as the same value as the reference picture index value of the neighboring prediction unit (hereinafter, referred to as "neighboring prediction unit for deriving reference picture index") if 1) there is the neighboring prediction unit of the prediction object block corresponding to a location (xP−1, yP+nPSH−1), 2) a partition index value of the neighboring prediction unit for deriving reference picture index is 0, 3) the neighboring prediction unit for deriving reference picture index is not a block that performs the prediction using the intra prediction mode, and 4) the prediction object block and the neighboring prediction unit for deriving reference picture index are not included in the same MER (Motion Estimation Region). If the above conditions are not satisfied, the reference picture index value of the temporal merging candidate may be set to 0.

The temporal merging candidate is determined and the motion prediction related information is derived from the temporal merging candidate (step S820).

In order to determine the temporal merging candidate block (Col block) and derive the motion prediction related information based on the determined temporal merging candidate block (Col block), a location of the Col block which is used to derive a temporal prediction motion vector may be determined based on conditions such as, for example, whether the Col block is available for the prediction object block, or where a location of the prediction object block is relative to the LCU (e.g., whether the location of the prediction object block is located at a bottom boundary or a right boundary relative to the LCU). Through deriving the motion prediction related information based on the determined reference picture information of the Col block and the motion prediction vector information, the motion prediction related information may be derived from the temporal merging candidate block (Col block).

A merging candidate list is constructed (step S830).

The merging candidate list may be constructed by including at least one of the spatial merging candidate and the temporal merging candidate. The spatial merging candidate and the temporal merging candidate included in the merging candidate list may be arranged with a fixed priority.

The merging candidate list may be constructed by including a fixed number of merging candidates. When merging candidates are deficient for generating the fixed number of the merging candidates, a merging candidate may be generated by combining the motion prediction related information of the merging candidate or the merging candidate list may be generated by adding a zero vector as the merging candidate.

As described above, the above method of deriving the merging candidate may be used not only in the inter-frame prediction method using the merge mode but also in the inter-frame prediction mode using the skip mode and this exemplary embodiment is also included in the claim scope of the present invention.

While the present disclosure has been described with reference to exemplary embodiments thereof, it will be understood by those of ordinary skill in the art that various changes and modifications may be made therein without departing from the spirit and scope of the present invention as defined by the following claims.

The invention claimed is:

1. A method of decoding a video signal under a merge mode in a video decoding apparatus, comprising:
  obtaining a spatial merge candidate of a current block from a neighboring block adjacent to the current block, motion prediction related information of the spatial merge candidate being determined based on the neighboring block;
  obtaining a collocated reference index for identifying a collocated picture;
  determining the collocated picture based on the collocated reference index, wherein the collocated picture is selectively determined from a plurality of decoded pictures included in a first reference picture list or a second reference picture list based on the collocated reference index;
  obtaining a temporal merge candidate of the current block from a collocated block in the collocated picture, motion prediction related information of the temporal merge candidate being determined based on the collocated block;

generating a merge candidate list including the spatial merge candidate and the temporal merge candidate; and performing inter prediction of the current block based on the generated merge candidate list.

2. The method of claim 1, wherein the motion prediction related information comprises at least one of a reference picture index, list utilization information, or motion vector information.

\* \* \* \* \*